FIG 1

Dec. 31, 1935.  A. S. FITZ GERALD  2,026,124
AUTOMATIC REGULATING SYSTEM
Filed Dec. 1, 1933  3 Sheets-Sheet 3

INVENTOR
Alan S. FitzGerald

Patented Dec. 31, 1935

2,026,124

UNITED STATES PATENT OFFICE 2,026,124

AUTOMATIC REGULATING SYSTEM

Alan S. Fitz Gerald, Wynnewood, Pa.

Application December 1, 1933, Serial No. 700,541
In Great Britain December 2, 1932

32 Claims. (Cl. 171—119)

This invention relates to automatic electric regulating and control systems and more particularly to voltage regulating systems which are carried into effect by changing the connections to tappings on transformer windings.

The present invention constitutes an improvement on that forming the subject matter of my copending United States application Serial No. 682,421, filed July 27, 1933, now Patent No. 2,021,099. In this earlier application I have disclosed a method of controlling a plurality of devices selectively or consecutively by varying the ratio between two electric currents.

My invention provides an automatic method of changing the taps on a power transformer so as to maintain a substantially constant voltage, by means of the selective electric control system disclosed in my aforesaid application.

According to my present invention, I connect each tapping on the transformer winding to the power line through a saturating reactor. In order to regulate the voltage, I cause any required one of these saturating reactors, at a time, to be saturated in accordance with the load conditions. In other words, the saturating reactors are utilized in place of tap-changing switches. When any one of these saturating reactors is saturated, it is the equivalent of closing a coresponding tap switch. The saturating reactors, connected to other taps which are not saturated, are the equivalent of tap switches which are in the open position.

In order to control the saturation of the several tap-changing saturating reactors, substantially only one at a time, so that any predetermined tap-changing saturating reactor may be saturated, in order to maintain the correct voltage, the tap-changing saturating reactors are controlled by means of the selective control system disclosed in my aforesaid application Serial No. 682,421. By varying the relation between two electric currents, any predetermined transformer tapping may be selected by furnishing the corresponding current ratio.

Automatic regulation is obtained by varying this current ratio whenever the voltage deviates from normal, thus changing one of the transformer tappings so as to restore the voltage to the proper value.

It is an object of my invention to provide an automatic tap-changing regulating system of exceptionally simple and reliable form, particularly suitable for installation and operation in rural districts where frequent inspection and supervision of apparatus is inconvenient, or for other locations where operating conditions are exceptionally severe such that automatic apparatus of the more usual type embodying contact-making voltmeters, relays and other electromechanical devices requiring extensive maintenance are not satisfactory.

It is a further object of my invention to provide an automatic tap-changing system which imparts no electrical disturbance to the power system through the opening and closing of tap switches. In my present invention, the tap-changing process is carried out smoothly without setting up transient disturbances or other shocks to the system.

It is a further object of my invention to provide a simple and economical voltage regulating equipment which can be applied to any existing distribution transformer having tappings in its windings.

It is another object of my invention to provide a novel method of controlling a tap-changing regulating transformer of the buck-and-boost type in which both primary and secondary tappings are employed in such a manner that the primary connection is held on one tap while the secondary tappings are varied and the secondary connection is held on one tap while the primary tappings are varied.

It is yet another object of my invention to provide a novel method of causing two currents to vary inversely in proportion to the magnitude of another single electrical effect.

These and other novel features which I believe to be characteristic of my invention will be set forth with particularity in the appended claims. My invention itself, however, both as to its organization and method of operation, together with further objects and advantages thereof, may be best understood with reference to the following description taken in connection with the accompanying drawings, in which

Figure 1:
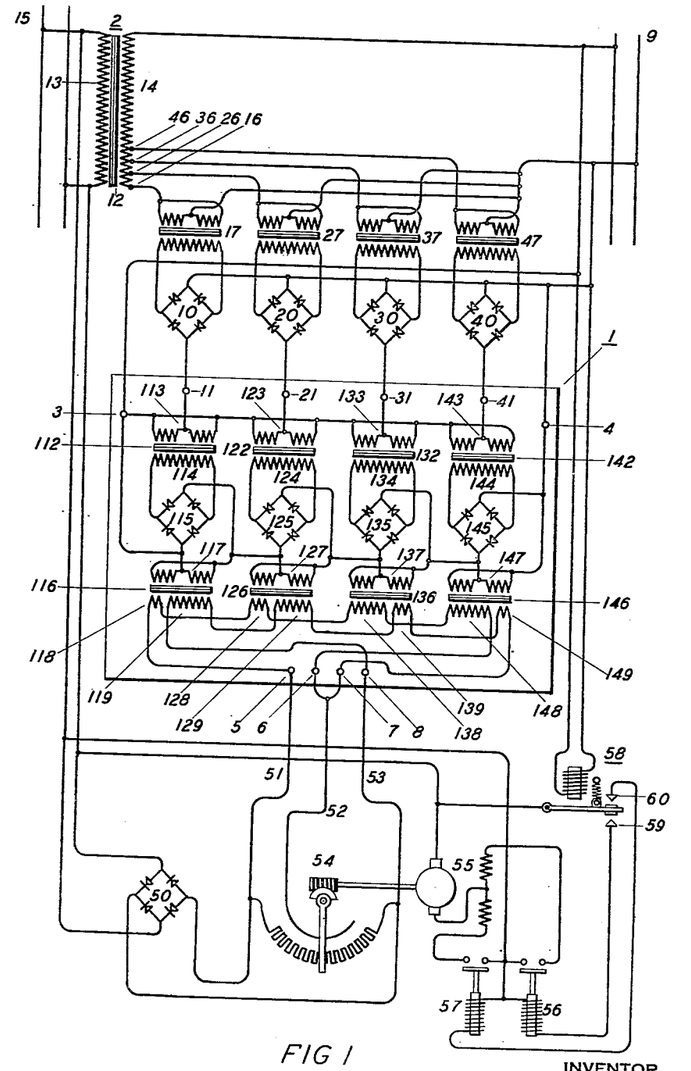
Figure 1 is a diagrammatic view of an embodiment of my invention for automatically controlling the voltage applied to a load circuit from a transformer having a secondary provided with a number of tappings.

In Fig. 1, I show a four-circuit selective control system 1 and a power transformer 2. The selective control system 1, which may represent a complete arrangement such as is disclosed in my aforesaid copending application, has terminals 3, 4, 5, 6, 7, 8, 11, 21, 31, 41, all as designated by like numerals in the figures of my copending application.

For a detailed explanation of the action of this selective control system, reference may be had to my above cited application. Briefly, in accordance with the operation of the system disclosed in my earlier application, loads 10, 20, 30, 40, connected to terminals 11, 21, 31, 41, may be selectively energized by varying the ratio of direct currents applied, respectively, to the terminals 5, 6 and 7, 8.

The selective control circuit 1 includes a plurality of saturable reactors 112, 122, 132, 142, having reactance windings 113, 123, 133, 143 and saturating windings 114, 124, 134, 144. The reactance windings are connected in series with the circuits 10, 20, 30, 40, which, in Fig. 1, are rectifiers. The saturating windings 114, 124, 134, 144, are energized with direct current from further rectifiers 115, 125, 135, 145. The circuit 1 also includes further saturable reactors 116, 126, 136, 146, having reactance windings 117, 127, 137, 147 and having each two saturating windings 118, 119, 128, 129, 138, 139, 148, 149. The four reactance windings 117, 127, 137, 147 are connected, in series, to terminals 3 and 4. These reactance windings are thus energized with alternating current from the load circuit 9. In parallel with each of the reactance windings 117, 127, 137, 147, I connect the alternating or input sides of the rectifiers 115, 125, 135, 145. Each of these rectifiers is accordingly energized with alternating current in accordance with the alternating voltage drop across the reactance windings of the aforesaid saturating reactors.

The saturating windings of the reactors 116, 126, 136, 146 are divided into two groups, each forming a complete series circuit. Thus, 118, 128, 138 and 148 are connected in series to terminals 5 and 6. Saturating windings 119, 129, 139, 149 are connected to terminals 7 and 8.

The saturating windings 118, 128, 138, 148 and 119, 129, 139, 149, respectively, are connected in opposition. Thus, referring, for example, to the saturating reactor 116, the net saturating effect will be the difference between the direct current excitation set up in the winding 118 and that set up in the winding 119. The same relation holds good for the reactors 126, 136, 146.

The ratio between the numbers of the turns of the two opposing saturating windings on each of the saturating reactors 116, 126, 136, 146 is dissimilar for each of these four reactors.

The circuit comprising the saturating windings 118, 128, 138, 148 is energized by applying direct current excitation to terminals 5 and 6. Likewise, the circuit which includes 119, 129, 139, 149 is energized by applying direct current excitation to terminals 7 and 8. The circuit 1 is selectively controlled by varying the relative magnitudes of the direct current excitation applied respectively to 5, 6 and 7, 8.

The ratio between these two direct currents may be varied in a number of different ways. I prefer to cause these two direct currents to vary in opposite sense or inversely. If desired, however, one of the direct currents may be varied and the other current may be maintained substantially constant. By the term "substantially constant," I mean that the second current is intended to vary only in accordance with the voltage of the source from which it is derived.

Let it be supposed, by way of example, that the circuit 1 be controlled by varying inversely the direct currents applied respectively to 5, 6 and 7, 8. If this method of variation be employed, the sum of the number of turns of the two saturating windings on each of the reactors 116, 126, 136, 146 may be the same in each case. That is to say, the turns of 118 plus 119; 128 plus 129; 138 plus 139, or 148 plus 149, may all be equal; but, the ratio of these turns will be dissimilar. It is, therefore, apparent that for any given reactor, there is one current ratio—and but one only—which, in conjunction with the respective number of turns on the two opposing windings, will set up equal and opposite excitation in these two windings, resulting in zero saturating ampere turns. This condition will arise when the current ratio is the reciprocal of the turn ratio. For all other current ratios, one or the other winding will preponderate and there will be resultant saturating ampere turns.

The selective control circuit 1 is so arranged that an unsaturated condition of any one of the reactors 116, 126, 136 or 146 causes energization of the corresponding external rectifier 10, 20, 30 or 40.

This result is achieved by the method of connection shown in Fig. 1 and previously described. The reactance windings 117, 127, 137 and 147 of the reactors 116, 126, 136, 146 are all connected in series across the load circuit 9. Thus, there will be a potential drop across each reactance winding commensurate with the effective value of the impedance thereof. If all of the reactances are unsaturated, or if all of them should be saturated to an equal extent, the drop across each of the windings 117, 127, 137, 147 would be equal. This condition, however, occurs only when the apparatus is not in action and the circuits connected to 5, 6 and 7, 8, are not energized with direct currents.

When the circuit 1 is controlled by the two ratio currents, due to the special turn ratios employed, in the manner above described, all of the reactors, except one, are saturated. Thus, the effective impedance of the reactance windings of the saturated reactors is low, but the impedance of the one winding situated on the reactor which receives, due to reciprocal coincidence between the turn ratio and the current ratio, zero saturation ampere turns, is much greater.

It follows, therefore, that the potential gradient along the series circuit, including the windings 117, 127, 137, 147, under this condition, is non-uniform. A substantial portion of the voltage of the load circuit 9 appears across the unsaturated reactor. A negligible voltage drop exists across the remaining reactors.

The rectifiers 115, 125, 135, 145, since they are connected in parallel with each of the windings 117, 127, 137, 147, will be energized in accordance with the above voltage drops. Thus, when the current ratio is such that one of the reactors 116, 126, 136, 146 is unsaturated, the corresponding rectifier 115, 125, 135, or 145 will be energized in accordance with the increased voltage drop across the reactance winding. The remaining rectifiers will be energized in a correspondingly less degree.

Each rectifier 115, 125, 135, 145 supplies saturating current to the saturating reactors 114, 124, 134, 144, which control the energization of the external rectifiers 10, 20, 30, 40. Thus, due to the action of the rectifiers 115, 125, 135, 145 and the reactors 112, 122, 132, 142, the rectifiers 10, 20, 30, 40 are selectively controlled by the ratio of the currents applied to the terminals 5, 6 and 7, 8. When the ratio is adjusted so that one of the reactors 116, 126, 136 or 146 is unsaturated, the corresponding external rectifier is fully energized. All of the other external rectifiers are energized to an inappreciable extent.

In Fig. 1, the four rectifiers 10, 20, 30, 40 are energized from the load circuit 9 through terminals 3, 4, 11, 21, 31, 41 of the selective control system 1 in a precisely similar manner to the elements bearing like numerals in the figures in my copending application.

The transformer 2 has a core 12, a primary winding 13 and a secondary winding 14, the primary winding being energized from a source 15. The secondary winding is furnished with an end terminal 16 and three taps 26, 36, 46, which are connected to the load circuit 9 through four saturating reactors 17, 27, 37, 47.

The saturating windings of the saturating reactors 17, 27, 37, 47 are severally energized with rectified current derived from the rectifiers 10, 20, 30, 40.

It will be readily apparent that, in accordance with the above arrangement, if two direct currents, variable in ratio, be applied, respectively, to terminals 5, 6 and 7, 8, any one of the saturable reactors 17, 27, 37, 47 may be caused to be saturated, the other three being unsaturated, by controlling the ratio of the currents supplied to 5, 6 and 7, 8, proportionately.

If the current ratio be controlled so as to saturate the reactor 17, this latter will represent a path of low impedance between the end terminal 16 and the load circuit 9, whereas, the reactors 27, 37, 47 will constitute a high impedance. Thus, in effect, terminal 16 will be connected to the load circuit 9 and the taps 26, 36, 46 disconnected therefrom. Accordingly, the full voltage of the transformer secondary winding 14 will be applied to the load circuit 9.

If, on the other hand, the current ratio controlling the selective control system 1 be varied so that the reactor 47 is saturated, the tap 46 will, in effect, be connected to the load circuit 9; 16, 26 and 36 will be substantially disconnected therefrom, and the voltage applied to the load circuit 9 will be reduced accordingly. In like manner, by suitably controlling the current ratio, either 26 or 36 may be effectively connected to the load circuit 9.

In order to render the system automatic in its action, I provide means for supplying two direct currents to terminals 5, 6 and 7, 8, and for changing the ratio of these currents, whenever the voltage of the load circuit 9 deviates from the correct value, in such a way as to restore the voltage to normal. I show in Fig. 1 conventional electromechanical apparatus for performing this function, so as to explain the working principles of my invention in the most direct manner.

In Fig. 1, I show a rectifier 50, energized from the supply circuit 15, for supplying the two variable ratio saturating currents to the control circuit 1, through the three conductors 51, 52, 53, and the rheostat 54 all as shown in my co-pending application. The rheostat 54 may be operated in either direction by means of the motor 55 and reversing relays 56 and 57. The reversing relays are controlled by means of a voltage relay 58, energized by the voltage of the load circuit 9. The voltage relay 58 has contacts 59 and 60, both of which are normally open, that is, when the voltage across the load circuit 9 is correct. The relay closes contact 59 when the voltage across the load is below normal and closes 60 when the voltage is too high. The motor 55 should drive the rheostat 54 in a clockwise direction when the relay 57, connected to contact 60 of relay 58, operates on high voltage. The rheostat should be operated in a counter clockwise direction by the relay 56, on low voltage.

According to this arrangement, when the voltage of the load circuit deviates from normal, tappings are changed automatically so as to restore the voltage to the proper value. For example, suppose that the voltage rises above the normal value so that contact 60 closes. This causes the rheostat to be actuated in a clockwise direction so as to reduce the current supplied to terminals 5, 6 and to increase that furnished to terminals 7, 8. This will vary the ratio of the currents in the saturating windings 118, 119 etc. so as to cause a lower tap to be selected. If the adjacent lower tap gives sufficient reduction of voltage so that the voltage relay 58 opens, the system will come to rest at this position. If this is not enough, the motor will continue to operate until a tap is reached, which gives the correct voltage.

While I have shown in Fig. 1, conventional apparatus for varying the two ratio currents so as to enable the principles of my invention to be readily understood, I prefer to use in place of relays and rotating apparatus, equipment of the type which has no contacts or moving parts, because such apparatus is more reliable and requires less attention. I show in Fig. 2, apparatus identical in its method of action to the system shown in Fig. 1, but in which means are provided for varying the ratio currents without the use of mechanical devices. This I accomplish by providing a circuit 18, the function of which is to provide two direct currents, inversely variable, and controlled in ratio in accordance with the magnitude of a single direct current. In order better to explain the principle of operation of the ratio-control circuit 18, I show in Fig. 3 an elementary diagram which illustrates the basis of this circuit.

Figures 2, 3:
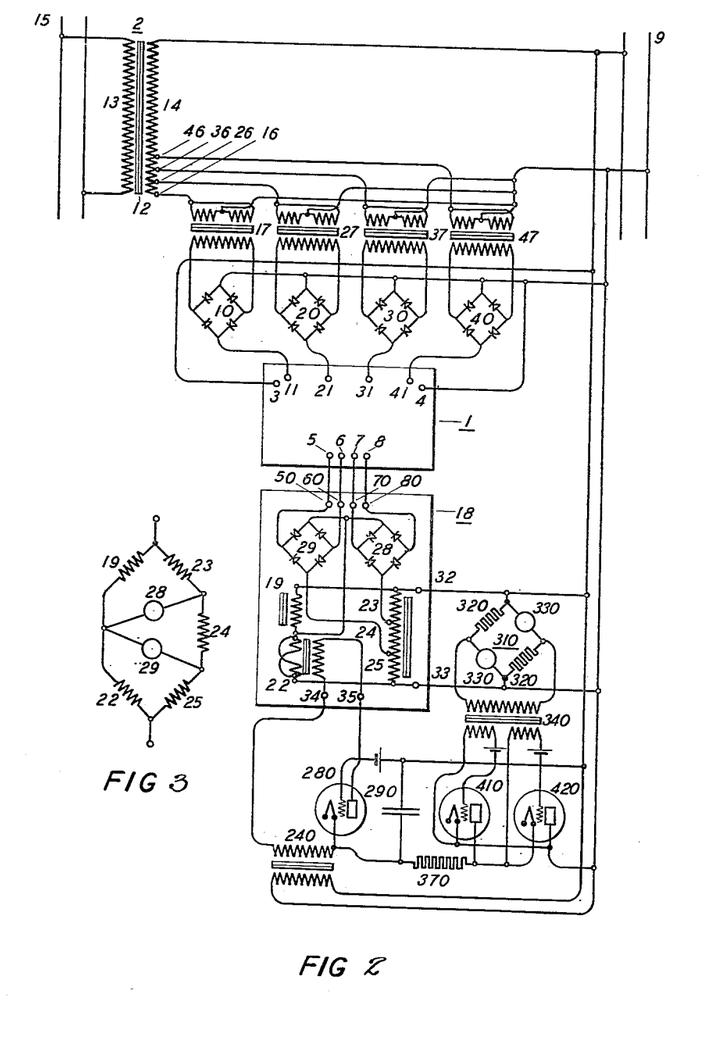
Fig. 2 is a modification of my invention.
Fig. 3 is an explanatory diagram illustrating the principle of operation of a portion of the embodiment of my invention shown in Fig. 2.

In Fig. 3, I show a circuit of the Wheatstone bridge type in a modified form. It is well known to those skilled in the art that the common Wheatstone bridge consists of two ratio arms, a fixed resistance, and a variable resistance, together with a relay or the like, and that by adjusting the variable resistance, the bridge may be balanced so that the relay current is zero. In the modified bridge circuit illustrated in Fig. 3, I show a fixed impedance 19 and a variable impedance 22 constituting one-half of the bridge circuit and three fixed impedances 23, 24, 25 constituting the other half of the bridge circuit. Instead of a single relay, I show two circuit elements 28 and 29 connected as shown in Fig. 3.

It will be apparent to those skilled in the art that this form of double bridge has two balance points. The variable impedance 22 may be adjusted so that the current in 28 will be zero. Under this condition there will be a current in 29. Again, the variable impedance 22 may be adjusted so that the circuit in 29 is zero. There will then be a current in 28. Thus, by varying 22 between the limits corresponding to the above two values, the currents in 28 and 29 may be varied inversely, and for any given value of 22 in between the specified limits, the currents in 28 and 29 will have a predetermined ratio.

Referring again to Fig. 2, the ratio control circuit 18 comprises a practical form of the bridge circuit shown in Fig. 3, and includes a reactor of fixed value 19, a saturable reactor 22, an autotransformer having three sections 23, 24 and 25 and two rectifiers 28 and 29. The method of connection of these elements in 18 corresponds precisely with Fig. 3 and the elements are indicated by like numerals. The bridge circuit is energized through terminals 32 and 33 from the load circuit 9 and the saturating winding of the saturating reactor 22 is brought out to a pair of terminals 34, 35, as shown. The rectified outputs of the rectifiers 29 and 28, respectively, are connected to terminals 50, 60 and 70, 80 which are connected to the corresponding terminals of the selective control circuit 1.

The operation of the ratio-control circuit is as follows:

By varying the impedance of the saturating reactor 22 by means of a saturating current applied to terminals 34, 35, a value of impedance may be found such that the current in 28 may be substantially zero, whereas, 29 will be energized. Accordingly, while no current will be supplied to terminals 7, 8 of the selective control circuit 1, current will be supplied to terminals 5, 6. If now, the saturating current applied to terminals 34, 35 be increased, thereby decreasing the impedance of 22, the bridge circuit may be caused to balance across 29 which will be substantially deenergized; but 28 will be energized. This adjustment, therefore, will cause current to be supplied to terminals 7, 8, but not to 5, 6.

It will be readily apparent to those skilled in the art, from the above explanation, that there will be four finite values of current which may be applied to terminals 34, 35, which will cause four corresponding values of the ratio of the currents supplied to terminals 5, 6 and 7, 8 and which will saturate selectively reactors 17, 27, 37 or 47, thereby effectively connecting either 16, 26, 36 or 46 to the load circuit 9. Thus, in order to secure automatic regulation, whenever the voltage across the load circuit 9 deviates from normal, all that is necessary is to increase or decrease the current supplied to terminals 34, 35 to such a value that the voltage is restored to normal and to maintain this value constant until a further deviation occurs.

This may be accomplished in any of a number of ways well known to those skilled in the art. I prefer, however, to use an arrangement which avoids the use of contacts and moving parts, such as I have shown in my United States Letters Patent No. 1,893,768, Fig. 3, and which forms no part per se of my present invention. This arrangement consists of the balanced bridge circuit 310 energized from the load circuit 9 which controls the operation of two electric valves 410 and 420.

According to my preferred control system, the saturating winding of the saturating reactor 22 is energized through terminals 34, 35 from the secondary winding of a transformer 240 in series with an electric valve 280. The grid of the valve 280 is excited with the potential across a capacitor 290. The grid circuit is provided with a suitable negative bias potential since, with this system of control, the grid should be maintained negative at all times. The capacitor 290 is arranged to be charged through a high resistor 370 by means of the two electric valves 410 and 420 which are reversely connected in parallel so that the capacitor may be charged to either polarity, by means of the transformer 340, from the load circuit 9. The transformer 340 is provided with two secondary windings which are connected to the grids of valves 410 and 420. As described in the aforesaid Patent No. 1,893,768, the grid transformer 340 is energized across a diagonal of the voltage-responsive bridge 310 which comprises two pairs of opposite arms 320 and 330 which have dissimilar current-resistance characteristics. The bridge 310 is energized across the other diagonal from the load circuit 9.

For a detailed explanation of the operation of this arrangement, reference may be had to aforesaid U. S. Letters Patent No. 1,893,768. Briefly, when the voltage of the load circuit 9 is correct, the bridge circuit 310 is balanced; no voltage is applied to the grids of the valves of 410 and 420 and the voltage across capacitor 290 remains at a constant positive value. When the voltage across the load deviates from normal, the action of the valves 410 and 420 modifies the charge of the capacitor 290. If the voltage rises above normal, the positive charge of the capacitor 290 is increased. This increases the conductivity of the valve 280 and increases the saturating current in the reactor 22. As a result, the impedance of 22 is reduced, thus increasing the current in 28 and reducing that in 29. This changes the ratio of the rectified current supplied to 5, 6 and 7, 8, increasing that in 7, 8 and reducing that in 5, 6. This has the effect, through the action of the selective control circuit 1, of selecting a lower tap on the transformer 2. When the voltage is restored to normal, the bridge 310 again balances and the charge on the capacitor 290, the saturating current supplied to 22, and the ratio of the currents supplied to 5, 6 and 7, 8 all remain steady until a further deviation takes place.

If the voltage falls below normal, the bridge unbalances in the opposite direction and the action of the valves 410 and 420 is such as to reduce the charge of capacitor 290 to a lower positive value, thus bringing about, in similar manner, an opposite effect which causes a higher tap on the transformer 2 to be selected.

While I have referred, in describing the operation of this invention, to the saturation of the reactors 17, 27, 37, 47, only one at a time, I have found, in reducing this invention to practice, that it regulates uniformly throughout the entire regulating range, two reactors contributing to the desired result, if the required voltage comes in between two adjacent taps.

The arrangement I have shown and described is one which can readily be applied to any existing distribution transformer. Such transformers are usually furnished with a number of taps. While I have shown in Figs. 1 and 2 an arrangement in which taps are brought out from a secondary winding, it will be obvious to those skilled in the art that the arrangment can be adapted equally well in connection with taps in the primary winding.

My automatic regulating system can be built with especial advantage to form a regulating arrangement in connection with a transformer of the buck-and-boost type as distinct from an equipment adapted for use with an existing distribution transformer. Such a transformer may have a primary connected across the power supply, portions of the secondary winding being connected in series with the load. The control equipment, according to my invention, of such an arrangement, may be precisely as I have shown in Fig. 2, the taps being uniformly distributed throughout the secondary winding. Connection to the tap at one extremity of the secondary winding, by saturation of the corresponding reactor, would give full boost, and saturation of the reactor connected to the opposite extremity would give full buck.

However, for providing buck-and-boost regulation, I prefer to use the method of tap-changing, known to those skilled in the art, in which both the input and the output connections to the series or secondary winding of the regulating transformer, are provided with tap-changing apparatus. When this method is used, a regulating transformer of only one-half the power rating otherwise necessary is required.

Figure 4:
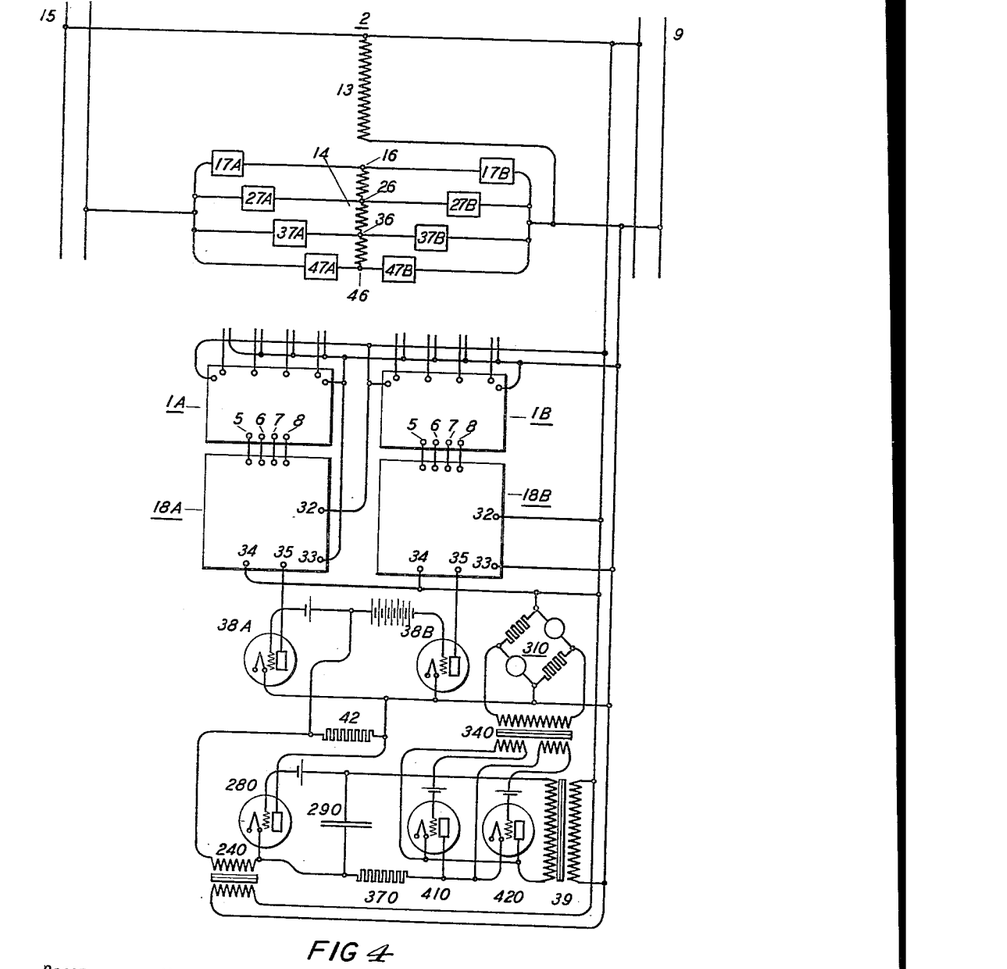
Fig. 4 is a diagrammatic view of a further modification of my invention as applied to a buck-and-boost regulating transformer.

I show in Fig. 4 a diagrammatic view of a buck-and-boost regulating transformer controlled in the above manner in accordance with my invention.

In Fig. 4, I show a regulating transformer 2, having a shunt winding 13 and a series or secondary winding 14, energized from a power source 15 and delivering power to load circuit 9. The secondary winding 14 has a terminal 16 at one extremity, two equally-spaced intermediate tappings 26 and 36 and a terminal 46 at the other extremity. The shunt winding 13 is connected directly to the load circuit 9. It is connected to the source 15 through the series winding 14 by means of a double set of saturating reactors 17A, 27A, 37A, 47A and 17B, 27B, 37B and 47B, by means of which the effective connection of the series winding may be adjusted so as to give either boosting or bucking action. When the turns of the series winding 14 are effectively connected so as to be additive, in relation to the winding 13, a bucking effect is produced. When the effect of the winding 14 is subtractive the regulating transformer has, in effect, fewer primary turns and more secondary turns and a boosting action results.

In order to control the saturation of the reactors 17A, 27A, 37A, 47A and 17B, 27B, 37B and 47B so as to produce bucking or boosting action in various degrees according to the requirements of the load, I provide, for each group of reactors, a selective control circuit 1 and a ratio control circuit 18, both precisely as shown and described in and with reference to Fig. 2. In Fig. 4 these circuits are respectively designated 1A, 1B and 18A, 18B. Saturating current for controlling the ratio-control circuits 18A and 18B is furnished by a pair of electric valves 38A and 38B energized from the load circuit 9.

In Fig. 4, in order to simplify the diagram, I have not shown winding details of the saturating reactors 17A, 27A, 37A, 47A and 17B, 27B, 37B and 47B, and have omitted the rectifiers 10, 20, 30, 40. It is to be understood that the connections between the selective control circuit and the saturating reactors in Fig. 4 are exactly in accordance with the showing in Fig. 2, except that the connections between 1B and 17B, 27B, 37B and 47B are in opposite sequence as is clearly indicated by the position of the latter items in Fig. 4.

The method by means of which I provide a joint controlling action of the circuit 1a, 1b and 18a and 18b so as to provide bucking and boosting action, which I am about to describe, will be better appreciated if the method of tap control or ratio adjustment for a transformer arrangement, such as is illustrated in Fig. 4, be recalled. For full boost, connection should be made from supply circuit 15 to terminal 16 and from terminal 46 to the load circuit 9. For two-thirds boost, the respective connections would be to 26 and 46; for one-third boost to 36 and 46, and for the neutral position, the source 15 and the load circuit 9 may be connected to terminal 46.

For one-third buck the source 15 should be connected to 46 and tapping 36 should be connected to load circuit 9. For two-thirds buck connections should be made to terminals 46 and 26. For full buck the source 15 is connected to 46 and the load circuit 9 connected to terminal 16.

From the above it will be observed that with this arrangement, for the range from full boost to neutral, it is necessary to make selective connection from the source 15 either to 16, 26, 36 or 46, maintaining the connection between 46 and the load circuit unchanged. For the range from neutral to full buck, the connection from the source 15 to terminal 46 should remain unchanged, the connection from load circuit 9 being switched either to 46, 36, 26 or 16, according to the amount of buck required.

It will be seen from the above, then, that the controlling action required from full boost to neutral should consecutively saturate reactors 17A, 27A, 37A or 47A, maintaining 47B saturated throughout this range. Throughout the bucking range 47A should be maintained completely saturated, 47B, 37B, 27B and 17B being consecutively controlled. The required action, therefore, of the selective control and ratio-control circuits 1A, 1B and 18A and 18B is that for the boosting range 1A and 18A should vary, whereas, 1B and 18B should remain in a steady condition. For the bucking range 1A and 18A should remain constant so as to keep 47A saturated and 1B and 18B should vary.

I show in Fig. 4 transformer 240, the electric valve 280, capacitor 290, voltage-responsive bridge 310, grid transformer 340, electric valves 410 and 420, all exactly as shown in Fig. 2, except that in Fig. 4 the electric valves 410 and 420 are energized through an isolating transformer 39. Electric valves 38A, 38B and 280 should, of course, all be operated on the same half cycle.

Thus, in the arrangement shown in Fig. 4, the electric valve 280 will be responsive to voltage change in precisely the same manner and degree as described with reference to Fig. 2. It will be recalled that when the voltage across the load circuit 9 is correct, the anode current of 280, controlled by the charge of capacitor 290, will be maintained at a constant value. When the voltage rises above normal the current in 280 will be increased, and when the voltage falls below normal, the current in 280 will be reduced. In Fig. 4, I cause the anode current of electric valve 280 to flow through a resistor 42. The voltage drop across resistor 42, proportional to the current in electric valve 280, is adapted to control the electric valves 38A and 38B, the connections being such that current in 280 causes a positive voltage to be applied to the grids of both 38A and 38B.

Figure 5:
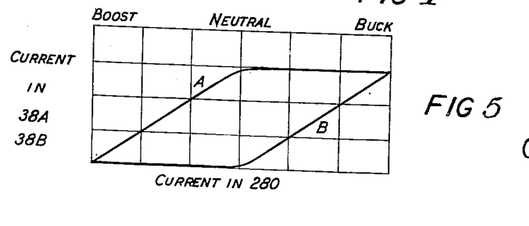
Fig. 5 is a curve to illustrate the action of my invention as shown in Fig. 4.

The special characteristic of the controlling action required, as explained above, is secured by means of electric valves 38A and 38B. Fig. 5 is a curve intended to illustrate the action of electric valves 38A and 38B.

Fig. 5 shows two curves, curve A and curve B serving to indicate the characteristic of the relation between the anode currents of 38A and 38B, respectively, and the anode current of electric valve 280.

The desired controlling action is obtained by embodying in the circuits and characteristics of the electric valves 38A and 38B features which cause these to respond in the manner indicated in Fig. 5. For example, 38A may be an electric valve of the type having a pure tungsten cathode operating at such a temperature, in relation to the anode voltage, that the saturation effect in the cathode emission is manifested. The negative grid bias applied to electric valve 38B is made substantially greater than that applied to 38A.

Action of the valves 38A and 38B is, therefore, adjusted so as to secure the characteristic illustrated in Fig. 5. Assume, for example, that the voltage across load 9 is considerably below normal. Under this condition, the capacitor 290 will be completely discharged and there will be no current in electric valve 280. Accordingly, there will be no drop across resistor 42, and the grids of 38A and 38B having a negative bias, there will be no anode current in either 38A or 38B. Under these conditions, the ratio control circuits 18A and 18B will energize 1A and 1B with current in such ratio that the extreme left-hand circuit will be selectively energized in both cases. Thus, 17A and 47B will be saturated and the regulating transformer will be connected for full boost.

Assume, further, that the voltage across the load rises until it reaches a normal value. If it remains at that point, no further action will take place in the control circuit. If the voltage rises still further, action of the electric valves 410 and 420 will cause a positive voltage to be applied to the capacitor 290. The capacitor will commence to charge through the high resistance 370, and the voltage across it will commence steadily to increase. Accordingly, there will be, in the anode circuit of the electric valve 280, a current which will likewise steadily build up. This will cause a corresponding increasing voltage to appear across resistor 42 which will apply a steadily growing positive voltage between the grids and cathodes of the electric valves 38A and 38B. In turn, an increasing current will be set up in 38A due to which a progressive change in the ratio of the currents supplied by 18A to 1A will take place. In due course, saturating current will be withdrawn from 17A and 27A will be saturated instead. While this is happening, there will be no change in the conditions with reference to the electric valve 38B and its associated circuits due to the greater negative bias applied to the grid. Thus, 47B will remain saturated. The change from 17A to 27A will decrease the voltage applied to the load circuit 9, and if this is sufficient to restore the voltage to normal, the valve 410 or the valve 420 will cease to be conducting and no further increase in charge of the capacitor 290 will take place. Dynamic action in the circuit will cease and no further change will take place until the load voltage again deviates.

A further increase in the load voltage will cause a similar action resulting progressively in the saturation of 37A and, ultimately, 47A, when the system is in the neutral position. The emission of the electric valve 38A should reach saturation at this point. Likewise, the negative bias applied to 38B should be such as to allow 38B to commence conductivity if the positive voltage applied thereto increases beyond this point.

Suppose, now, that a still further increase in the load voltage takes place. The voltage across capacitor 290 will again commence to increase, as will likewise the current in the electric valve 280, and the positive voltage applied to the grid of 38A and 38B. The valve 38A having reached its saturation point, no further increase in the current supplied by 38A to 18A can occur. Current now appears, however, in 38B, causing a progressive change in the ratio of the currents supplied by 18B to 1B. As the voltage builds up across 290, saturation current will be withdrawn from 47B and 37B will be saturated. The regulating transformer is now at the one-third buck position. If this is sufficient to correct the voltage, action will cease at this point. However, if a still further bucking action is required by the load conditions, 27B and 17B may be selectively saturated, the latter condition representing the full buck position. It will be appreciated that due to the saturation effect of 38A, the saturating reactor 47A will remain saturated throughout the bucking range. In other words, no effective change takes place in the saturation of 47A throughout the range of the control which causes selective saturation of 47B, 37B, 27B or 17B. Likewise, due to the increased negative bias applied to 38B, 47B is saturated and no effective change takes place in the saturation of 47B throughout the range of control which causes selective saturation of 17A, 27A, 37A and 47A.

It is believed this action will readily be comprehended in reference to Fig. 5.

While, for the purpose of description and explanation, I have referred to the saturating effect indicated in curve A of Fig. 5 as being derived entirely from the emission characteristics of the electric valve 38A, it will be apparent to those skilled in the art that the design of the saturating reactor incorporated in 18A, which receives its saturating current from 38A, may be contributory to the provision of the desired characteristics.

In addition to the above-cited advantage of the arrangement shown in Fig. 4, in comparison with the system shown in Fig. 2, wherein it was pointed out that the regulating transformer may be of reduced power rating, the double-tapping system of connection shown in Fig. 4 has a further advantage in connection with the use of saturating reactors for the purpose of tap-changing. It will be apparent to those skilled in the art that the power rating of the tap-changing saturating reactors is a function of the current rating of the regulator and of the tap voltage. It will be appreciated that the two saturating reactors connected to the two taps which are farthest apart are connected in series across the voltage existing between these two taps. Thus, the maximum voltage for which the tap-changing saturating reactors must be designed is, in Fig. 4, one-half of that which it would be if the same total number of taps were equally spaced over the voltage range represented by the voltage between full boost and full buck.

It will also be appreciated that, theoretically, the power rating of tap-changing saturating reactors is a minimum at the center of any tapped winding and increases towards the extremities. Thus, in the arrangement shown in Fig. 4 there is less lack of uniformity in the power requirements of the several tap-changing saturating reactors.

While I have shown, by way of illustration, an arrangement for controlling four taps, it will be obvious to those skilled in the art that my invention may be adapted with equal facility to any number of tappings, since the selective control element 1, as I have explained in my aforesaid application Serial No. 682,421, may be furnished for controlling a substantially greater number than four circuits.

Moreover, while I have shown and described, by way of illustration, an embodiment of my invention adapted to be used in connection with transforming or translating circuits, I wish it to be clearly understood that the novel features of my invention may be employed in generator regulating systems as well.

Although I have shown and described an automatic system of regulation actuated by the load conditions, it is to be clearly understood that my system of selective control of tap-changing saturating reactors, in accordance with the ratio between two electric currents, has utility and value for tap-changing control in general. For example, such a system is particularly suitable for changing the taps on a power transformer by remote manual control.

While the bridge circuit illustrated, in principle, in Fig. 3 is an especially suitable and convenient method of controlling the two ratio currents in the present invention, this method of producing two inversely variable currents in accordance with the variation in a single controlling electrical element has many other uses and applications in view of its simplicity and efficiency. For example, it is particularly well adapted for the purpose of controlling illuminating circuits, especially where it is desired to fade in and fade out illumination of two different colors.

Although I have chosen a particular embodiment of my invention for the purpose of explanation, many modifications thereof will be apparent to those skilled in the art to which it pertains. My invention, therefore, is not to be limited except insofar as is necessitated by the prior art and the spirit of the appended claims.

What I claim as new and desire to secure by Letters Patent of the United States is:

1. In combination, an alternating current supply circuit, a load circuit, interconnecting means comprising at least three conducting paths for determining the relative potentials of said circuits, a plurality of saturable core devices included in said paths, and means for saturating a saturable core device in any predetermined one of said paths at the same time maintaining in a substantially unsaturated condition the saturable core devices in all of the remaining paths.

2. In combination, an alternating current supply circuit, a load circuit, interconnecting means comprising at least three conducting paths for determining the relative potentials of said circuits, a plurality of saturable core devices included in said paths, and means for saturating a saturable core device in predetermined two of said paths at the same time maintaining in a substantially unsaturated condition the saturable core devices in all of the remaining paths.

3. In combination, an alternating current supply circuit, a load circuit, interconnecting transforming means having at least three connections giving different effective transformation ratios for determining the relative potentials of said circuits, a plurality of saturable core devices included in said connections, and means for saturating a saturable core device in any predetermined one of said connections at the same time maintaining in a substantially unsaturated condition the saturable core devices in all of the remaining connections.

4. In combination, an alternating current supply circuit, a load circuit, interconnecting transforming means having at least three connections giving different effective transformation ratios for determining the relative potentials of said circuits, a plurality of saturable core devices included in said connections, and means for saturating a saturable core device in any predetermined two of said connections at the same time maintaining in a substantially unsaturated condition the saturable core devices in all of the remaining connections.

5. In combination, an alternating current supply circuit, a load circuit, interconnecting means comprising at least three conducting paths for determining the relative potentials of said circuits, a plurality of saturable core devices included in said paths and means responsive to an electrical condition of said load circuit for saturating a saturable core device in any predetermined one of said paths at the same time maintaining in a substantially unsaturated condition the saturable core devices in all of the remaining paths.

6. In combination, an alternating current supply circuit, a load circuit, interconnecting means comprising at least three conducting paths for determining the relative potentials of said circuits, a plurality of saturable core devices included in said paths and means responsive to an electrical condition of said load circuit for saturating a saturable core device in any predetermined two of said paths at the same time maintaining in a substantially unsaturated condition the saturable core devices in all of the remaining paths.

7. In combination, an alternating current supply circuit, a load circuit, interconnecting transforming means having at least three connections giving different effective transformation ratios for determining the relative potentials of said circuits, a plurality of saturable core devices included in said connections, and means responsive to an electrical condition of said load circuit for saturating a saturable core device in any predetermined one of said connections at the same time maintaining in a substantially unsaturated condition the saturable core devices in all of the remaining connections.

8. In combination, an alternating current supply circuit, a load circuit, interconnecting transforming means having at least three connections giving different effective transformation ratios for determining the relative potentials of said circuits, a plurality of saturable core devices included in said connections, and means responsive to an electrical condition of said load circuit for saturating a saturable core device in any predetermined two of said connections at the same time maintaining in a substantially unsaturated condition the saturable core devices in all of the remaining connections.

9. In an electric system, a source of power, a first circuit element, a second circuit element, said first and second elements being connected in series to said source, a third, fourth and fifth circuit element, said third, fourth and fifth circuit elements being connected in series to said source but in parallel with said first and second circuit elements, a sixth circuit element connected between the junction of said first and second elements and the junction of said third and fourth elements, a seventh circuit element connected between the junction of said first and second element and the junction of said fourth and fifth elements, and means for varying an electrical characteristic of one of said first and second circuit elements so as to cause a predetermined one of said sixth and seventh circuit elements to be substantially deenergized and another of said sixth and seventh circuit elements to be energized.

10. In an electric system, means for producing a plurality of electrical effects simultaneously variable in an opposite sense, comprising a source of power, an impedance of substantially constant value, a saturable core device having a reactance winding and a saturating winding, said reactance winding and said first mentioned impedance being connected in series to said source, a third circuit element, a fourth circuit element and a fifth circuit element, said last-mentioned three elements being likewise connected in series to said source but in parallel with said first and second circuit elements, a sixth circuit element connected between the junction of said first-mentioned impedance winding and said reactance winding and the junction of said third and fourth circuit elements, a seventh circuit element connected between the junction of said impedance and said reactance winding and the junction of said fourth and fifth circuit elements, whereby the energization of said sixth and said seventh circuit elements is varied in opposite sense when a saturating current is caused to flow in the saturating winding of said saturable core device.

11. In combination, an alternating current supply circuit, a load circuit, interconnecting transforming means having a plurality of connections giving different effective transformation ratios for determining the relative potentials of said circuits, a group comprising a plurality of saturable core devices included in said connections, a second group comprising further saturable core devices included in said connections, means responsive to an electrical condition of said load circuit for simultaneously saturating a predetermined one of said second group of saturable core devices and each of the saturable core devices included in said first group consecutively, and thereafter simultaneously saturating a predetermined one of the saturable core devices included in said first group and each of the saturable core devices included in said second group consecutively.

12. In combination, an alternating current supply circuit, a load circuit, interconnecting transforming means having a winding provided with a plurality of tappings connected to said supply circuit through a plurality of saturable core devices, and a plurality of tappings connected through further saturable core devices to said load circuit, means responsive to electrical conditions of said load circuit for varying the effective connection of said tappings to said supply circuit, and the effective connection of said tappings to said load circuit by selective saturation of said saturable core devices in such a manner that simultaneously a predetermined one of said tappings is effectively connected to said supply circuit and a plurality of further tappings are each consecutively effectively connected to said load circuit.

13. In combination, an alternating current supply circuit, a load circuit, interconnecting transforming means having a winding provided with a plurality of tappings connected to said supply circuit through a plurality of saturable core devices and a plurality of tappings connected through further saturable core devices to said load circuit, means responsive to electrical conditions of said load circuit for varying the effective connection of said tappings to said supply circuit, and the effective connection of said tappings to said load circuit by selective saturation of said saturable core devices in such a manner that simultaneously a predetermined one of said tappings is effectively connected to said load circuit and a plurality of further tappings are each consecutively effectively connected to said supply circuit.

14. In combination, an alternating current supply circuit, a load circuit, interconnecting transforming means having a winding provided with a plurality of tappings connected to said supply circuit through a plurality of saturable core devices and a plurality of tappings connected through further saturable core devices to said load circuit, means responsive to electrical conditions of said load circuit for varying the effective connection of said tappings to said supply circuit, and the effective connection of said tappings to said load circuit by selective saturation of said saturable core devices in such a manner that under one electrical condition a predetermined one of said tappings is effectively connected to said supply circuit while each of said tappings is consecutively effectively connected to said load circuit, and under another electrical condition a predetermined one of said tappings is effectively connected to said load circuit while each of said tappings is consecutively effectively connected to said supply circuit.

15. In combination, an alternating current supply circuit, a load circuit, interconnecting transforming means having a winding provided with a plurality of tappings connected to said supply circuit through a plurality of variably conductive devices, and a plurality of tappings connected to said load circuit through further variably conductive devices, means responsive to electrical conditions of said load circuit for varying the effective connection of said tappings of said supply circuit and the effective connection of said tappings to said load circuit by selective control of the conductivity of said variably conductive devices in such a manner that under one electrical condition a predetermined one of said tappings is effectively connected to said supply circuit while a plurality of said tappings are each consecutively effectively connected to said load circuit and under another electrical condition a predetermined one of said tappings is effectively connected to said load circuit while a plurality of said tappings are each consecutively effectively connected to said supply circuit, said means including an electric valve adapted to reach the emission saturation point and a second electric valve having sufficient negative grid bias that it is substantially nonconducting when said first-mentioned electric valve is below its emission saturation point and is only conductive when said first-mentioned valve has reached the saturation point.

16. In combination, an alternating current supply circuit, a load circuit, interconnecting means comprising a plurality of conducting paths for determining the relative potentials of said circuits, a plurality of saturable core devices included in said paths, and means comprising further saturable core devices energized in accordance with a plurality of electrical effects for saturating any predetermined one of said first-mentioned saturable core devices in accordance with the relative magnitudes of said electrical effects.

17. In combination, an alternating current supply circuit, a load circuit, interconnecting means comprising a plurality of conducting paths for determining the relative potentials of said circuits, a plurality of saturable core devices included in said paths, and means comprising further saturable core devices energized in accordance with a plurality of electrical effects for saturating any predetermined one of said first-mentioned saturable core devices in accordance with a relation between said electrical effects.

18. In combination, an alternating current supply circuit, a load circuit, interconnecting transforming means having a plurality of connections giving different effective transformation ratios for determining the relative potentials of said circuits, a plurality of saturable core devices included in said connections, means comprising further saturable core devices for selectively saturating any predetermined one of said first-mentioned saturable core devices in accordance with the ratio between two electrical effects, an electric valve, means for furnishing two electrical effects relatively variable in accordance with the space current of said electric valve, a condenser connected to the grid of said valve, means for charging and discharging said condenser in accordance with a departure from a predetermined electrical condition of said load circuit whereby, through selective saturation of said first-mentioned saturable core devices, the effective transformation ratio of said transforming means is controlled in accordance with an electrical condition of said load circuit.

19. In combination, an alternating current supply circuit, a load circuit, a transformer having a plurality of tappings connecting said supply circuit to said load circuit, a plurality of saturable core devices included in the connections to said tappings, a plurality of rectifiers for furnishing saturating current to said devices, means for selectively energizing said rectifiers in accordance with the ratio of two electric currents, a bridge circuit having two balance points and including a saturable core device for furnishing two electric currents inversely variable in accordance with the saturation of said last-mentioned saturable core device, an electric valve for furnishing saturating current thereto, a condenser connected to the grid of said valve, two further oppositely connected electric valves for charging and discharging said condenser, a normally balanced voltage-responsive bridge energized from said load circuit and a circuit for similarly exciting the grids of said oppositely connected valves in accordance with the unbalanced voltage of said responsive bridge.

20. In combination, an alternating current supply circuit, a load circuit, a buck-and-boost transformer connecting said supply circuit to said load circuit, said transformer having a winding with a plurality of tappings, a plurality of saturable core devices for connecting a number of said tappings to said supply circuit, further saturable core devices for connecting a number of said tappings to said load circuit, a plurality of rectifiers for furnishing saturating current to said devices, means for selectively energizing the rectifiers associated with said first-mentioned saturating core devices in accordance with the ratio of two electric currents, means for selectively energizing said rectifiers associated with said second-mentioned saturable core devices in accordance with the ratio of two further electric currents, a first bridge circuit having two balance points and including a saturable core device for furnishing two electric currents inversely variable in accordance with the saturation of said saturable core device, a second like bridge circuit, an electric valve, adapted to reach the emission saturation point for furnishing saturating current to the saturable core device included in said first bridge, a second electric valve having sufficient negative grid bias that it is substantially non-conducting when said first-mentioned valve is below its emission saturation point for furnishing saturating current to the saturable core device included in said second bridge, a third electric valve, a voltage-drop-producing element included in the anode circuit of said third valve adapted positively to energize the grid circuit of said first and second electric valves, a condenser connected to the grid of said valve, two further oppositely connected electric valves for charging and discharging said condenser, a normally balanced voltage-responsive bridge energized from said load circuit and a circuit for similarly exciting the grids of said oppositely connected valves in accordance with the unbalanced voltage of said responsive bridge.

21. In combination, an alternating current supply circuit, a load circuit, interconnecting means comprising a plurality of conducting paths connected to said supply circuit and a plurality of conducting paths connected to said load circuit, for determining relative potentials of said circuits, a plurality of saturable core devices included in said paths, and means for saturating simultaneously a predetermined one of the saturable core devices included in the conducting paths connected to said load circuit and a predetermined one of the saturable core devices included in the conducting paths connected to said supply circuit.

22. In combination, an alternating current supply circuit, a load circuit, interconnecting transforming means giving different effective transformation ratios for determining the relative potentials of said circuits, said interconnecting means comprising a plurality of conducting paths connected to said supply circuit and a plurality of conducting paths connected to said load circuit, a plurality of saturable core devices included in said paths, and means for saturating simultaneously a predetermined one of the saturable core devices included in the conducting paths connected to said load circuit and a predetermined one of the saturable core devices included in the conducting paths connected to said supply circuit.

23. In combination, an alternating current supply circuit, a load circuit, interconnecting means comprising a plurality of conducting paths connected to said supply circuit and a plurality of conducting paths connected to said load circuit, for determining relative potentials of said circuits, a plurality of saturable core devices included in said paths, and means responsive to an electrical condition of said load circuit for saturating simultaneously a predetermined one of the saturable core devices included in the conducting paths connected to said load circuit and a predetermined one of the saturable core devices included in the conducting paths connected to said supply circuit.

24. In combination, an alternating current supply circuit, a load circuit, interconnecting transforming means giving different effective transformation ratios for determining the relative potentials of said circuits, said interconnecting means comprising a plurality of conducting paths connected to said supply circuit and a plurality of conducting paths connected to said load circuit, a plurality of saturable core devices included in said paths, and means responsive to an electrical condition of said load circuit for saturating simultaneously a predetermined one of the saturable core devices included in the conducting paths connected to said load circuit and a predetermined one of the saturable core devices included in the conducting paths connected to said supply circuit.

25. In combination, a supply circuit, a load circuit, interconnecting means comprising a plurality of conducting paths for determining the relative potentials of said circuits, a plurality of controllable devices included in said paths for causing said paths to be at one time effectively conducting and at another time effectively non-conducting, and means for controlling said devices comprising, a plurality of saturable core devices, a plurality of control circuits for said controllable devices, means for controlling the energization of each of said control circuits in accordance with the degree of saturation of one of said saturable core devices, and means common to said saturable core devices for selectively applying effective saturation to a pre-determined number of said saturable core devices selectively to control said controllable devices.

26. In combination, a supply circuit, a load circuit, interconnecting means comprising a plurality of conducting paths for determining the relative potentials of said circuits, a plurality of controllable devices included in said paths for causing said paths to be at one time effectively conducting and at another time effectively non-conducting, and means for controlling said devices comprising, a plurality of saturable core devices, a plurality of control circuits for said controllable devices, means for controlling the energization of each of said control circuits in accordance with the degree of saturation of one of said saturable core devices, means common to said saturable core devices for selectively applying effective saturation to a pre-determined number of said saturable core devices, and means responsive to an electrical condition of said load circuit for varying said common means selectively to control said controllable devices.

27. In combination, an alternating current supply circuit, a load circuit, a transformer having a plurality of taps for determining the relative potentials of said circuits, tap-changing means comprising, a plurality of saturable core devices, each of said devices having an alternating current winding, a first direct current saturating winding and a second direct current saturating winding, said second saturating winding opposing the saturating effect of said first saturating winding, the ratio between the turns of said first and second windings being different in each of said saturable core devices, all of said first saturating windings being connected together to form a first direct current saturating circuit and all of said second saturating windings being connected together to form a second direct current saturating circuit, means for energizing said first saturating circuit and said second saturating circuit, respectively, with saturating currents having a pre-determined relative magnitude, so as to cause all of said saturable core devices except one to be saturated, means for determining said relative magnitude, a plurality of output circuits energized from said alternating current supply circuit, and means for controlling the energization of each of said output circuits inversely in accordance with the degree of saturation of one of said saturable core devices so as to cause the output circuit associated with the saturable core device which is unsaturated to be energized to a substantially greater extent than the remaining output circuits, and means connecting said output circuits to control said tap-changing means.

28. In combination, an alternating current supply circuit, a load circuit, a transformer having a plurality of taps for determining the relative potentials of said circuits, tap-changing means, and means for controlling said tap-changing means comprising a plurality of saturable core devices, each of said devices having an alternating current winding, a first direct current saturating winding and a second direct current saturating winding, said second saturating winding opposing the saturating effect of said first saturating winding, the ratio between the turns of said first and second windings being different in each of said saturable core devices, all of said first saturating windings being connected together to form a first direct current saturating circuit and all of said second saturating windings being connected together to form a second direct current saturating circuit, means for energizing said first saturating circuit and said second saturating circuit, respectively, with saturating currents having a pre-determined relative magnitude so as to cause all of said saturable core devices except one to be saturated, means responsive to an electrical condition of said load circuit for determining said relative magnitude, a plurality of output circuits energized from said alternating current supply circuit, and means for controlling the energization of each of said output circuits inversely in accordance with the degree of saturation of one of said saturable core devices, so as to cause the output circuit associated with the saturable core device which is unsaturated to be energized to a substantially greater extent than the remaining output circuits, and means connecting said output circuits to control said tap-changing means.

29. In combination, an alternating current supply circuit, a load circuit, a transformer having a plurality of taps for interconnecting said circuits, and means for selecting any one of said taps comprising, an alternating current supply circuit, a plurality of saturable core devices having each an alternating current winding a first direct current saturating winding and a second direct current saturating winding, said second saturating winding opposing the saturating effect of said first saturating winding, all of said alternating current windings being connected in series to said alternating current supply circuit, the ratio between the turns of said first and second windings being different in each of said saturable core devices, all of said first saturating windings being connected together to form a first direct current saturating circuit and all of said second saturating windings being connected together to form a second direct current saturating circuit, a plurality of output circuits, means for energizing each of said output circuits in accordance with the voltage across one of said alternating current windings, together with a source of direct current, said first and said second direct current saturating circuits being energized therefrom, means for varying the ratio between the magnitudes of the direct currents flowing in said first and said second direct current saturating circuits, and means connecting said output circuits to control said tap-selecting means.

30. In combination, an alternating current supply circuit, a load circuit, a transformer having a plurality of taps for interconnecting said circuits, and means for selecting any one of said taps comprising, an alternating current supply circuit, a plurality of saturable core devices having each an alternating current winding a first direct current saturating winding and a second direct current saturating winding, said second saturating winding opposing the saturating effect of said first saturating winding, all of said alternating current windings being connected in series to said alternating current supply circuit, the ratio between the turns of said first and second windings being different in each of said saturable core devices, all of said first saturating windings being connected together to form a first direct current saturating circuit and all of said second saturating windings being connected together to form a second direct current saturating circuit, a plurality of output circuits, means for energizing each of said output circuits in accordance with the voltage across one of said alternating current windings, together with a source of direct current, said first and said second direct current saturating circuits being energized therefrom, and means responsive to an electrical condition of said load circuit, for varying the ratio between the magnitudes of the direct currents flowing in said first and said second direct current saturating circuits, and means connecting said output circuits to control said tap-selecting means.

31. In an electric system, a first electric valve and a second electric valve, means for producing a variable electrical effect, means for controlling both of said valves simultaneously in accordance with said variable effect, a first work circuit and a second work circuit, means for controlling each of said circuits in accordance with the space current of one of said valves, one of said valves being caused to reach the emission saturation point and the other valve having sufficient negative bias that it is substantially non-conducting when said first mentioned valve is below its emission saturation point and is only conducting when said first mentioned valve has reached the saturation point, whereby, when said electric effect is varied through a given range, at one portion of said range, said first valve exerts a variable control upon said first circuit and said second valve causes no appreciable variation of said second circuit, and at another portion of said range, said second valve exerts a variable control upon said second circuit and said first valve causes no appreciable variation of said first circuit.

32. In combination, an alternating current supply circuit, a load circuit, a regulating transformer of the buck-and-boost type having a winding provided with a plurality of taps, means for effectively connecting said supply circuit to any one of said taps, means for effectively connecting said load circuit to any one of said taps, and means responsive to an electrical condition of said load circuit for under one condition varying the connection of said supply circuit to said taps and for connecting said load circuit to one of said taps while said supply circuit tap connections are varied and under another condition for varying the connection of said load circuit to said taps and for connecting said supply circuit to one of said taps while said load circuit tap connections are varied, one of said conditions being used for boosting the voltage across said load circuit and another of said conditions being used for bucking.

ALAN S. FITZ GERALD.